(No Model.) 2 Sheets—Sheet 2.
J. GUZOWSKI.
MACHINE FOR SHARPENING CHALK.
No. 548,252. Patented Oct. 22, 1895.
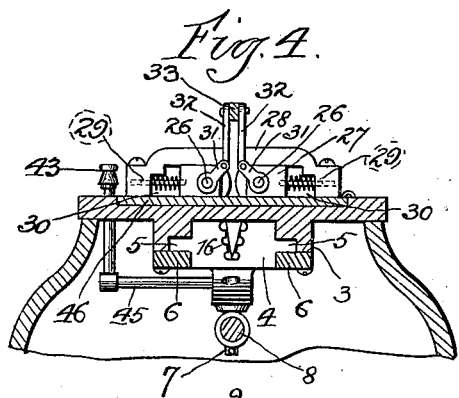
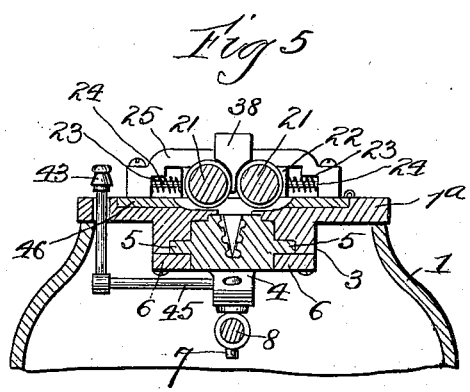
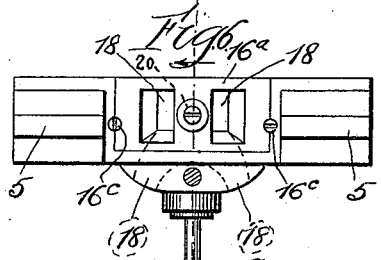
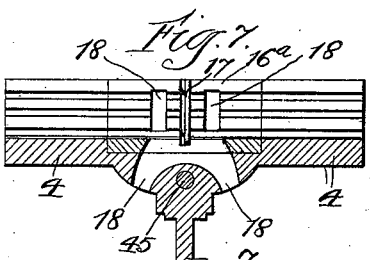
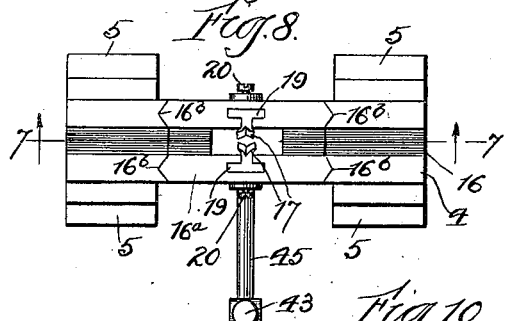
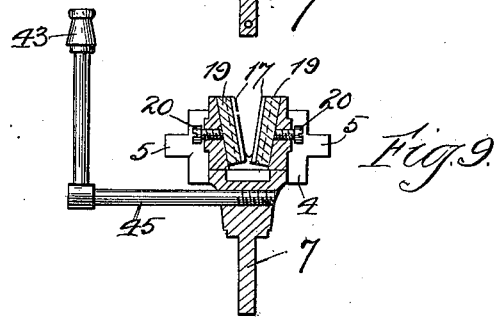
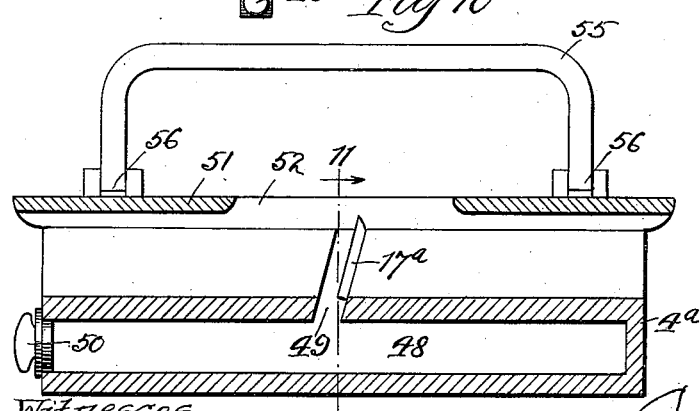
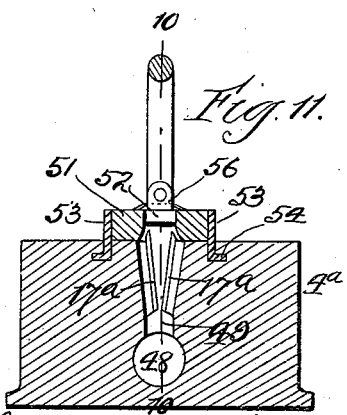
Witnesses Inventor

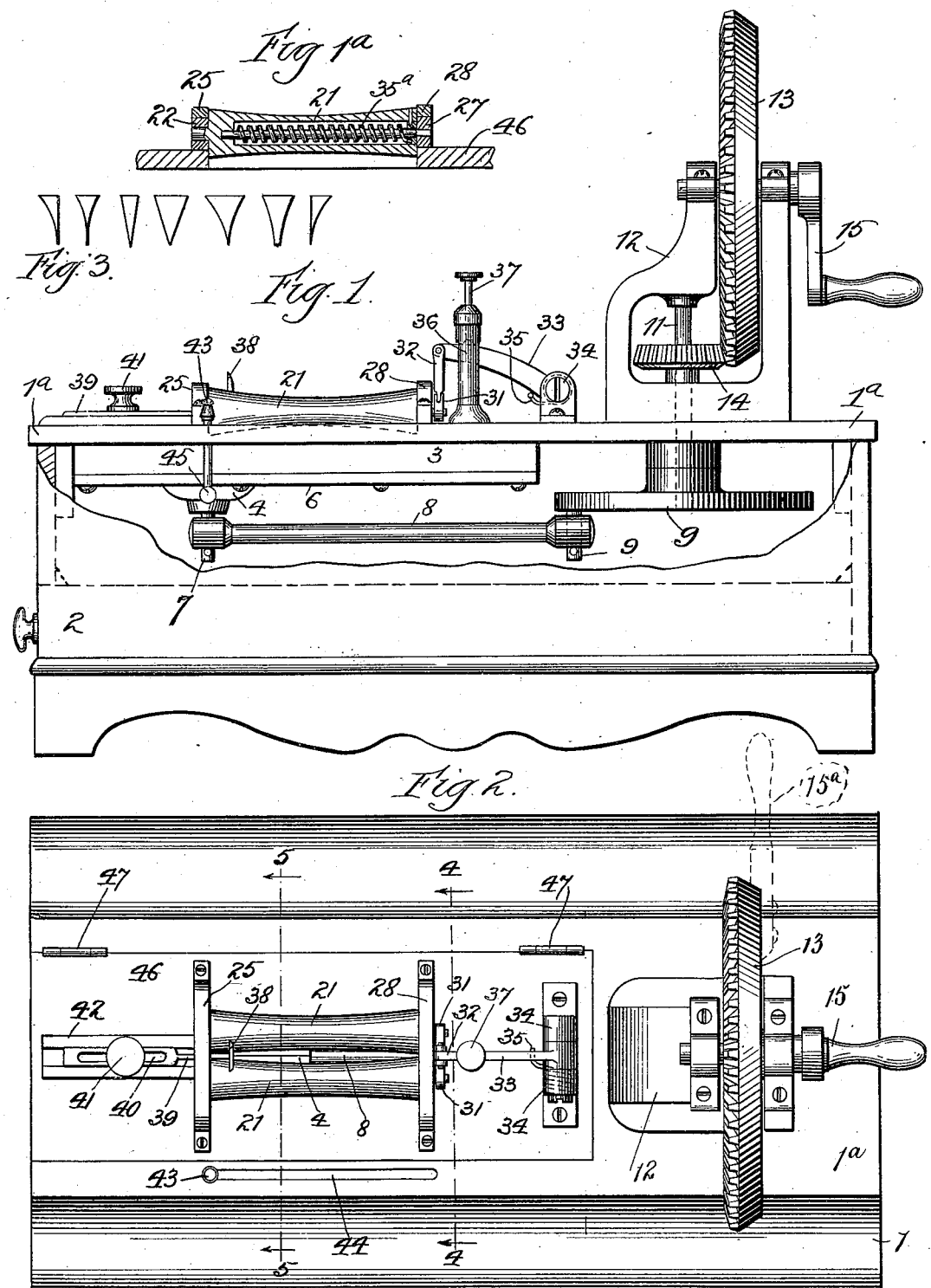

UNITED STATES PATENT OFFICE.

JOSEPH GUZOWSKI, OF CHICAGO, ILLINOIS.

MACHINE FOR SHARPENING CHALK.

SPECIFICATION forming part of Letters Patent No. 548,252, dated October 22, 1895.

Application filed May 6, 1895. Serial No. 548,286. (No model.)

*To all whom it may concern:*

Be it known that I, JOSEPH GUZOWSKI, a citizen of the United States, residing at Chicago, in the county of Cook and State of Illinois, have invented certain new and useful Improvements in Machines for Sharpening Chalk, of which the following is a full, clear, and exact specification.

My invention relates to means for sharpening chalk and other similar articles, and it is more particularly designed for producing a marking-edge on chalk used by tailors for marking cloth.

The primary object of my invention is to provide means whereby tailors' chalk and other similar articles may be readily and accurately whittled or ground away on one or both sides for producing the desired marking-edge.

With these ends in view my invention consists in certain features of novelty in the construction, combination, and arrangement of parts by which the said object and certain other objects, hereinafter appearing, are attained, all as fully described with reference to the accompanying drawings, and more particularly pointed out in the claims.

In the said drawings, Figure 1 is a side elevation of my improved device, part of the casing being broken away for showing the internal mechanism; and Fig. 1ª is a vertical longitudinal section, showing a modification of one of the rollers hereinafter described. Fig. 2 is a plan view of the device shown in Fig. 1. Fig. 3 is a detail diagrammatic view hereinafter described. Fig. 4 is a detail transverse sectional view taken on the line 4 4, Fig. 2. Fig. 5 is a similar view taken on the line 5 5, Fig. 2. Fig. 6 is an enlarged side elevation of the knife-carrier hereinafter described. Fig. 7 is a longitudinal sectional view of the same, taken on the line 7 7, Fig. 8. Fig. 8 is a plan view thereof. Fig. 9 is a transverse sectional view thereof, taken on the line 9 9, Fig. 6; and Figs. 10 and 11 are views of a modified form of my invention, showing its embodiment in a hand-operative device, Fig. 10 being a vertical longitudinal section taken on the line 10 10, Fig. 11, and Fig. 11 being a transverse sectional view taken on line 11 11, Fig. 10.

Like signs of reference indicate like parts throughout the several views.

1 represents a box or casing of any suitable design upon and in which the mechanism of my improved apparatus is arranged. Located in this box, near the bottom thereof, is a drawer or pan 2 for catching the chips and dust falling from the chalk.

The under side of the top plate 1ª of the box or casing 1 is provided with a runway 3, in which works a cross-head or knife-carrier 4, the cross-head 4 being provided with lateral flanges 5, which engage under shoulders on the ways 3, as shown in Figs. 4 and 5, and rest upon removable flanges 6, whereby the cross-head 4 may be readily reciprocated. The under side of the cross-head or knife-carrier 4 is provided with a depending stem or pin 7, to which is pivoted a pitman 8, whose other end is pivoted to a wrist-pin 9 on a horizontal disk 10. This latter is mounted upon a vertical shaft 11, extending upwardly through the plate 1ª and being journaled in a bracket 12, which also carries a beveled gear 13, whose lower edge is in engagement with a beveled pinion 14, secured to the shaft 11, the shaft of the gear 13 being provided with a crank 15 or other suitable operating-handle, such as the lever 15ª shown in dotted lines in Fig. 2. It will be seen that its continuous rotation or its oscillation back and forth will impart a reciprocating movement to the cross-head or knife-carrier 4.

The knife-carrier 4 is provided in its upper side with a longitudinal groove or channel 16, and arranged on each side of this channel is a knife 17, whose edges are given a form and arrangement complementary to the form of the edge to be produced on the chalk. As shown in Figs. 4 to 9, inclusive, each of these knives 17 has a straight edge, and the two knives are arranged at an acute angle to one another, the apex of the angle being at their lower ends. Thus it will be seen that should the chalk be held in the groove or channel 16 while the cross-head or knife-carrier 4 is reciprocated the knives would produce a V-shaped marking-edge thereon. The form and arrangement of the knives 17, however, is a mere matter of taste and may be varied according to the shape of the marking-edge desired, the forms of some of which edges are shown in Fig. 3 of the drawings, and it will be understood that knives of complementary form and arrangement will be employed when these forms are desired. In order that these knives 17 may be readily removed when it is desired to replace them by knives having a different form and arrangement, I mount such knives in a removable block 16$^a$, which is provided with knife-edges 16$^b$, which are inserted in complementary grooves in the cross-head or carrier 4, the block 16$^a$ being secured in place by screws 16$^c$ or other suitable devices. By this means the block 16$^a$ may be taken out and another block having knives of the desired form readily inserted in its stead. The knives themselves are also provided with individual blocks 19, which are inserted in sockets formed in the block 16$^a$ and held securely in place by set-screws 20, thus affording means for adjusting the knives vertically and also for removing them independently of the block 16$^a$, and hence making it possible to replace them by knives of a different form without removing the block 16$^a$; but it is preferable to make the alteration by entirely removing the block 16$^a$ and inserting another block in its stead, because it is desirable to have the walls of the channel 16 approximately conform to the shape to be produced on the edge of the chalk, though it is not necessary that the walls of that portion of the channel 16 which passes beyond the ends of the block 16$^a$ be so formed. In the drawings, however, they are shown thus formed.

In order that the knives 17 may cut in both directions, each is provided with a double edge, as shown in Fig. 8, and in order that the chips and dust removed by the knives may be at liberty to drop out of the channel 16 and fall into the drawer or pan 2 I provide the knife-carrier with a number of discharge-openings 18.

For the sake of reducing the friction of the walls of the channel 16 against the chalk such walls are corrugated or grooved longitudinally, as shown in Figs. 4, 5, and 7.

The plate 1$^a$ immediately above and along the line of movement of the knives 17 is provided with a slot or opening, as shown in Fig. 5, through which the chalk to be sharpened is inserted, and in order that the chalk may be held in the proper position while operated upon by the knives 17 I arrange a pair of rollers 21 immediately over the said slot in the plate 1$^a$, one along each side thereof, so that the chalk may be inserted between them. These rollers 21 have their journals at one end mounted in sliding blocks 22, which are forced toward each other by means of springs 23, coiled upon pins 24, upon which the blocks slide and which are themselves secured in a bracket or yoke 25. The journals 26 at the other ends of the rollers are mounted in sliding blocks 27, arranged under a yoke 28 and having pins 29 sliding in sockets in such yoke and being provided with coil-springs 30, which force the blocks 27 normally together. By this construction it will be seen that the rollers 21 will separate to admit the chalk when the latter is forced down between them and at the same time will grip the chalk with sufficient force to hold it in the proper position while being acted upon by the knife, the upper side of the chalk being steadied, if desired, by the hand of the operator. The rollers 21 are also provided with springs for rotating them upwardly and oppositely, whereby the operation of forcing the chalk between them will tend to rotate them against their said springs, and when the pressure of the hand on the chalk is released the springs will tend to eject the chalk by rotating the rollers in the opposite direction. This may be best accomplished by providing each of the journals 26 with a crank-arm 31, to which is secured a link 32, which latter is pivoted at its upper end to an arm 33. The arm 33 is pivoted in brackets 34 and forced normally upward by means of a spring 35. The end of the arm is steadied and guided by a slotted standard 36, in which also works a stem 37, by means of which the arm 33 may be depressed for causing the downward rotation of the rollers when it is desired to insert the chalk. A simpler arrangement, however, is that shown in Fig. 1$^a$, in which each of the rollers 21 is constructed like an ordinary curtain-roller, the spring 35$^a$ for rotating it being arranged internally, as will be understood, and the crank-arms 31, the arm 33, and other necessary adjuncts being omitted.

In order that the rollers may better conform to the shape of the chalk when it is desired to sharpen the chalk all around, they are narrowed toward their mid-lengths, as shown.

38 represents a gage or stop arranged between the rollers for determining the position in which the chalk of a given size should be held in order to be completely traversed by the knives 17. This gage 38 is fitted between and conforms to the rollers 21, as shown in Fig. 5, and is provided with a slide 39, having a slot 40, through which passes a thumb-screw 41 for locking the gage in the desired position, the slide 39 being guided by flanges 42.

It is, of course, important that the knives 17 should be at some point between the ends of the chalk when the latter is inserted, in order that the knive may not come into engagement at their first stroke with the abrupt end of the chalk, and therefore in order that the location of the knives may be determined I secure an indicator 43 to the knife-carrier or cross-head 4 and pass it upward through a slot 44 in the plate 1$^a$. This indicator may consist of an ordinary knob, as shown, having a stem depending through the slot 44 and being carried by an arm 45, which is suitably secured to the cross-head or knife-carrier 4, and consequently causes the indicator 43 to move with the knives and to occupy a corresponding position with reference to the length of the rollers 21.

In order that the knives 17 may be readily inspected without removing the plate 1ª and the attached mechanism, I mount the rollers 21, as also the gage 38 and the brackets 34, upon a plate 46, which is let into the face of the plate 1ª and secured thereto at one edge by hinges 47, whereby the superposed mechanism may be turned back out of the way to disclose the cross-head and its connected parts.

In the simple form of my invention shown in Figs. 10 and 11 the knives 17ª are mounted in a fixed block 4ª, the latter being provided with a longitudinal V-shaped channel, under which is arranged a longitudinal bore 48, which communicates with said V-shaped channel through opening 49, and through which latter the chips and dust from the chalk fall, such chips being removed, when desired, through the end of the bore 48, which is closed by a stopper 50. Arranged over the knives 17ª is a slide 51, which is provided with an opening 52, through which the chalk is inserted and held in contact with the knives 17ª, the chalk in this form being reciprocated by the slide 51, while the knives are held stationary. The slide 51 is provided with flanges 53, which are let into the upper face of the block 4ª and provided with salient edges 54, whereby the slide may be reciprocated longitudinally, but not withdrawn vertically. The slide may be withdrawn, however, in a longitudinal direction. The top of the slide is provided with a handle 55, which bridges the opening 52 and which is hinged to the slide by any suitable spring-hinge 56, which will cause it to stand in an upright position when so placed, whereby the handle may be turned to one side when it is desired to insert an extra large piece of chalk.

Having thus described my invention, what I claim as new therein, and desire to secure by Letters Patent, is—

1. A device for the purpose described having in combination a chalk holder and a knife holder and one being movable longitudinally and parallel with reference to the other, the knife holder being provided with a longitudinal channel in which the chalk runs, and knives projecting into said channel; and a chalk holder being arranged over said knife holder and provided with a vertical opening arranged over and longitudinally of said channel for the insertion of the chalk, substantially as set forth.

2. A device for the purpose described having in combination a reciprocating cross-head, a knife mounted upon said cross-head, and a pair of cushioned rollers arranged along the line of movement of said knife, substantially as set forth.

3. A device for the purpose described having in combination a reciprocating cross-head, a knife mounted on said cross-head, a pair of cushioned rollers arranged along the line of movement of said knife, and springs for rotating said rollers in one direction, substantially as set forth.

4. A device for the purpose described having in combination a reciprocating cross-head, a knife mounted on said cross-head, a pair of cushioned rollers arranged along the line of movement of said knife, and a gage arranged between said rollers, substantially as set forth.

5. A device for the purpose described having in combination a reciprocating cross-head, a knife mounted on said cross-head, a pair of cushioned rollers arranged along the line of movement of said knife, a crank arm secured to each of said rollers, and a spring actuated arm connected to said crank arms, substantially as set forth.

6. A device for the purpose described having in combination a reciprocating cross-head, a knife mounted on said cross-head, a pair of cushioned rollers arranged along the line of movement of said knife, a crank arm secured to each of said rollers, a spring actuated arm connected to said crank arms, and the operating stem 37 for depressing said spring actuated arm, substantially as set forth.

7. A device for the purpose described having in combination a reciprocating cross-head, a knife carried by said cross-head, means for holding the chalk to be sharpened, and an indicator secured to and operated by said cross-head for indicating the location of said knife, substantially as set forth.

8. A device for the purpose described having in combination a reciprocating cross-head, a knife carried by said cross-head, a plate upon which said cross-head is mounted having a slot arranged along the line of movement of said knife, means arranged above said plate for holding the chalk to be sharpened, and an independent plate for carrying the last said means, substantially as set forth.

9. A device for the purpose described having in combination a reciprocating cross-head provided with a knife, a plate upon which said cross-head is mounted, having a slot, an indicator secured to said cross-head and passing through said slot for indicating the position of said knife, and means arranged over said knife for holding the chalk to be sharpened, substantially as set forth.

10. A device for the purpose described having in combination a reciprocating cross-head provided with a knife, a plate having a slot extending along the line of movement of said knife, and a gage adjustable lengthwise of said slot, substantially as and for the purpose set forth.

11. A device for the purpose described having in combination a reciprocating cross-head having a longitudinal channel, a knife arranged in said channel, and means for holding the chalk to be sharpened in said channel and in engagement with said knife, substantially as set forth.

12. A device for the purpose described having in combination a reciprocating cross-head provided with a removable block, a knife mounted in said block, and means for holding the chalk in engagement with said knife, substantially as set forth.

13. A device for the purpose described having in combination a reciprocating cross-head, a knife carried by said cross-head, said cross-head being provided with a longitudinal channel in which said knife is located and said channel being provided with discharge openings; and a slotted plate arranged over said cross-head, substantially as set forth.

14. A device for the purpose described having in combination a reciprocating cross-head provided with a V-shaped channel having grooved or corrugated walls, knives projecting through said walls and being arranged at an angle to each other, and a plate arranged over said cross-head and having a slot for the insertion of the chalk to be sharpened, substantially as set forth.

JOSEPH GUZOWSKI.

Witnesses:
F. A. HOPKINS,
EDNA B. JOHNSON.